(12) United States Patent  
Issler et al.

(10) Patent No.: US 7,789,421 B2
(45) Date of Patent: Sep. 7, 2010

(54) GAS BAG MODULE

(75) Inventors: Bernd Issler, Urbach (DE); Daniele Aranzulla, Schwaebisch Gmuend (DE); Juergen Schmid, Durlangen (DE)

(73) Assignee: TRW Automotive GmbH, Alfdorf (DE)

( * ) Notice: Subject to any disclaimer, the term of this patent is extended or adjusted under 35 U.S.C. 154(b) by 344 days.

(21) Appl. No.: 11/525,295

(22) Filed: Sep. 22, 2006

(65) Prior Publication Data

US 2007/0080530 A1    Apr. 12, 2007

(30) Foreign Application Priority Data

Oct. 6, 2005    (DE)    ........................ 10 2005 048 032

(51) Int. Cl.
B60R 21/16    (2006.01)
(52) U.S. Cl. .................. 280/743.2; 280/743.1; 280/739
(58) Field of Classification Search ................. 280/739, 280/743.1, 743.2
See application file for complete search history.

(56) References Cited

U.S. PATENT DOCUMENTS

| | | | |
|---|---|---|---|
| 3,527,475 A * | 9/1970 | Carey et al. .................. 280/739 |
| 5,280,953 A * | 1/1994 | Wolanin et al. ............. 280/739 |
| 5,350,188 A * | 9/1994 | Sato ........................... 280/739 |
| 6,746,045 B2 | 6/2004 | Short et al. |
| 6,832,778 B2 * | 12/2004 | Pinsenschaum et al. ..... 280/739 |
| 6,959,945 B2 * | 11/2005 | Fischer et al. ............... 280/739 |
| 7,059,634 B2 | 6/2006 | Bossecker et al. |
| 7,083,192 B2 | 8/2006 | Fischer et al. |
| 2002/0067032 A1 * | 6/2002 | Ishikawa .................. 280/743.1 |
| 2004/0051286 A1 | 3/2004 | Fischer et al. |
| 2004/0232677 A1 * | 11/2004 | Fischer et al. ............... 280/739 |
| 2005/0146122 A1 * | 7/2005 | Gould et al. ................ 280/739 |
| 2006/0125221 A1 | 6/2006 | Schneider et al. |
| 2006/0290117 A1 * | 12/2006 | Fischer et al. ............... 280/739 |
| 2007/0205590 A1 * | 9/2007 | Klinkenberger et al. .. 280/743.2 |

FOREIGN PATENT DOCUMENTS

| | | |
|---|---|---|
| DE | 10316026 | 10/2003 |
| DE | 10236859 | 2/2004 |
| DE | 102004027703 | 4/2005 |
| DE | 202004019325 | 5/2005 |

* cited by examiner

Primary Examiner—Toan C To
(74) Attorney, Agent, or Firm—Tarolli, Sundheim, Covell & Tummino LLP

(57) ABSTRACT

A gas bag module includes a module housing (18), a gas bag (24) having a gas bag wall (26), a discharge opening (20) which can be closed by a closure device (22), and a limiting strap (28), the limiting strap (28) being coupled with the gas bag wall (26) and the closure device (22). The limiting strap (28) is tensioned in case of an unimpeded unfolding of the gas bag (24) such that the closure device (22) closes the discharge opening (20), and the limiting strap (28) is guided along the gas bag wall (26).

20 Claims, 2 Drawing Sheets

GAS BAG MODULE

TECHNICAL FIELD

The invention relates to a gas bag module including a module housing, a gas bag having a gas bag wall, a discharge opening which can be closed by a closure device, and a limiting strap, the limiting strap being coupled with the gas bag wall and the closure device and the limiting strap being tensioned in the case of an unimpeded unfolding of the gas bag such that the closure device closes the discharge opening.

BACKGROUND OF THE INVENTION

Such a gas bag module offers advantages in particular restraint situations, such as for example a non-optimum restraint position of a vehicle occupant. As the closest prior art, US 2004/0051286 A1 discloses a gas bag module in which a distance between the vehicle occupant and a housing of the gas bag module is determined by means of limiting straps in an unfolding phase of the gas bag. With a sufficiently great distance, the limiting straps are tightened and discharge openings which are provided on the module side are closed. In another case, i.e. when the occupant is situated too close to the module housing, the discharge openings remain free and the gas bag unfolds neither at its full speed nor to its maximum hardness. Through this measure, occupants who are not optimally positioned are protected from the gas bag unfolding too aggressively.

As can be seen from the drawings of US 2004/0051286 A1, the gas bag module being described is particularly suitable for installation conditions in which the module opens towards the occupant and the gas bag unfolds as symmetrically as possible around the module. This typically applies to front passenger gas bags in the "mid-mount" position or driver's gas bags which are integrated in the steering wheel.

In the front passenger gas bags in the "top-mount" position (cf. FIG. 2) which are increasingly widespread nowadays, the described measurement of the distance between the module housing and the vehicle occupant is no longer possible in such a simple manner owing to the altered outlet position and the shape of the gas bag, and higher tolerances are involved. This can influence the reliability with which the discharge opening is closed or held open, according to the situation. In particular, occupants who are small, or child's seats which may be present are difficult to detect. In addition, it would be generally desirable to close the discharge opening on the module side not only on the basis of an optimum unfolding situation at a single point of the gas bag, namely the fastening point between the limiting strap and the gas bag wall, but on the basis of optimum unfolding possibilities of a determinative region of the gas bag.

It is therefore an object of the present invention to increase the sensitivity of a vehicle occupant restraint device with respect to an occupant who is not optimally positioned or with respect to a child's seat which is present during the unfolding process of the gas bag, and to reliably adapt the unfolding characteristic.

BRIEF SUMMARY OF THE INVENTION

This is achieved in a gas bag module including a module housing, a gas bag having a gas bag wall, a discharge opening which can be closed by a closure device, and a limiting strap, the limiting strap being coupled with the gas bag wall and the closure device. The limiting strap is tensioned in case of an unimpeded unfolding of the gas bag such that the closure device closes the discharge opening, and the limiting strap is guided along the gas bag wall.

The unfolding behaviour of the gas bag by the possible closure of existing discharge openings is thereby no longer dependent on a selective possibility for unfolding at the connection point between the limiting strap and the gas bag wall, but rather on the possibility for unfolding of a wall section along which the limiting strap is guided. The region of the gas bag in which an impeded unfolding of the gas bag is detected is increased compared with the prior art. Entirely for the purposes of occupant protection, more cases in which the discharge opening is to be kept open are thereby taken into consideration.

The discharge opening may be provided in the module housing, for example. This offers the advantage that the closure device can be readily mounted to the rigid module housing which is fixed to the vehicle, and can be easily moved into a defined opened or closed position.

The use of a ventilation flap as a closure device is possible here, whereby the discharge opening is to be simply closed by means of the tension of the tightened limiting strap.

In one embodiment, the limiting strap is guided substantially over its entire length along the gas bag wall. As the gas bag only reacts to obstacles to unfolding in the region in which the limiting strap is guided, the sensitivity of the gas bag also increases with an increasing length of guiding of the limiting strap.

Preferably, lugs are provided on the gas bag wall to guide the limiting strap. The guidance of the limiting strap along the gas bag wall is possible in a particularly simple and favourably priced manner by means of lugs. The more lugs are provided, i.e. the closer the limiting strap is guided along the gas bag wall, the more sensitively the gas bag reacts to obstacles to unfolding. Instead of the number of lugs, the length of the lugs can also be increased in order to increase the gas bag sensitivity.

In a further embodiment, the limiting strap lies substantially in a vertical plane in the unfolded state of the gas bag. This is particularly advantageous, because the gas bag reacts to obstacles in the region of the limiting strap over its entire height.

In another embodiment, the limiting strap lies substantially in a horizontal plane in the unfolded state of the gas bag. This offers advantages when the gas bag is to react sensitively to obstacles substantially over its entire width.

In addition, in the unfolded state the gas bag wall may have a front wall section facing an occupant, and a rear wall section facing away from the occupant, with the limiting strap extending from the rear wall section over the front wall section back to the rear wall section again. The front wall section substantially represents the possible contact surface with an occupant or with a child's seat. Therefore, a high sensitivity in the front wall section is desired, which is best achieved in that the limiting strap is guided over as great a length as possible along the front wall section.

In a further embodiment, a first end of the limiting strap is fastened to the rear wall section or to the module housing, and a second end is secured to the closure device. This is a particularly simple and favourably priced embodiment, because only one single limiting strap is necessary.

However, it is also possible that a first and a second end of the limiting strap are fastened to the rear wall section or to the module housing, and a traction strap is provided, a first end of the traction strap being secured to the limiting strap and a second end of the traction strap being secured to the closure device. Thereby, possible frictional influences between the gas bag wall and the limiting strap can be reduced. In addition, the point of attachment between the traction strap and the limiting strap can be selected in a way, that an optimum transfer of force is possible between the limiting strap and the closure device.

DETAILED DESCRIPTION OF THE PREFERRED EMBODIMENTS

Figure 1:
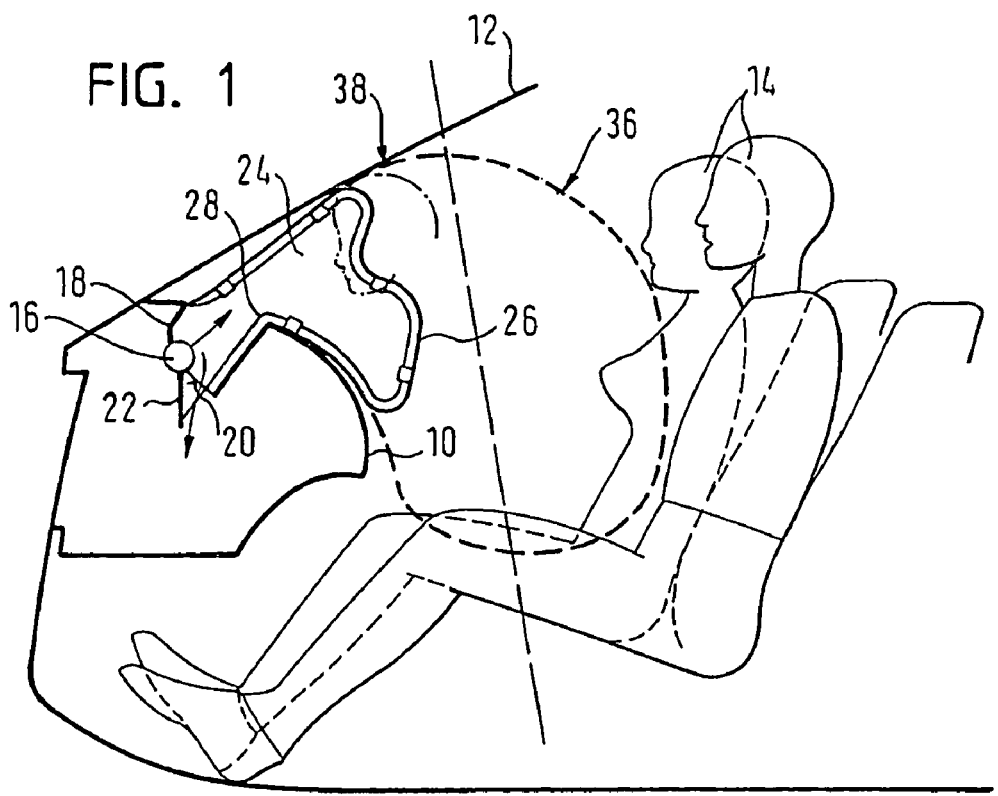
FIG. 1 shows a diagrammatic partial section through a front passenger side of a motor vehicle, with the unfolding of a gas bag being impeded.
Figure 2:
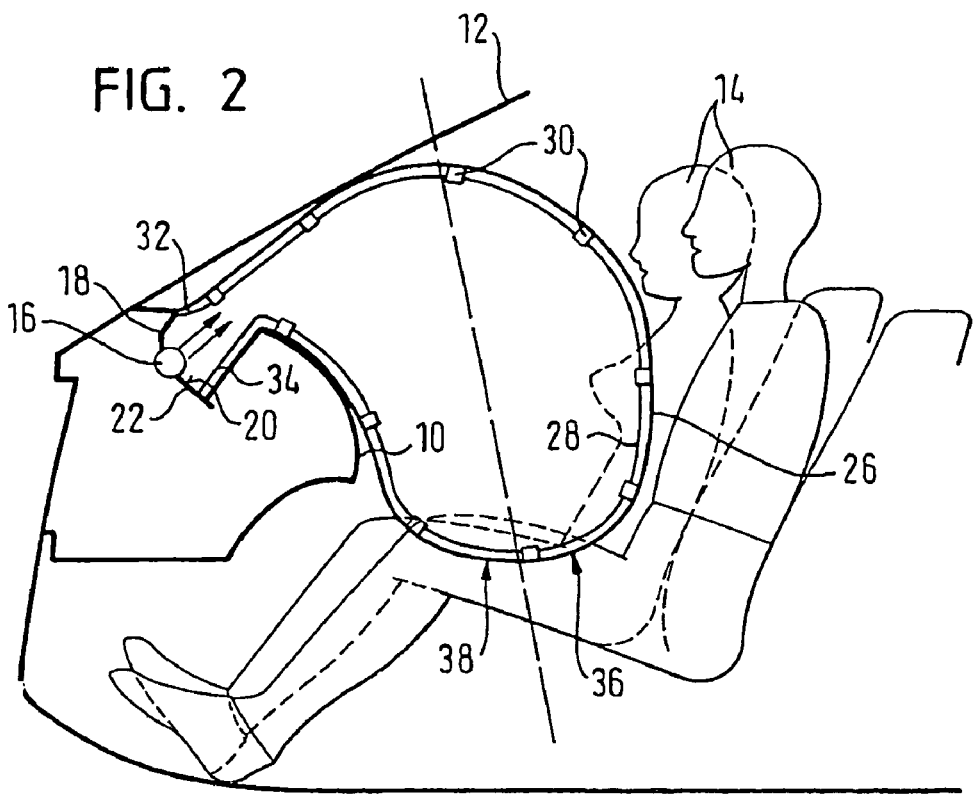
FIG. 2 shows a diagrammatic partial section through the front passenger side of the motor vehicle of FIG. 1, with the unfolding of the gas bag not being impeded.

FIGS. 1 and 2 show the front passenger side of a motor vehicle with an instrument panel 10, a windscreen 12 and an occupant 14. The occupant 14 is indicated by a male and a female dummy in various sitting positions. A gas bag module, of which a gas generator 16, a module housing 18 with a discharge opening 20 and an associated closure device 22 as well as a gas bag 24 are illustrated diagrammatically, is installed in the instrument panel 10.

The gas bag module is installed on the upper side of the instrument panel 10 close to the windscreen 12 ("top-mount" module). Such modules are increasingly taking the place of so-called "mid-mount" modules, which are arranged centrally in the region of a glove compartment of the instrument panel and the gas bag of which unfolds directly towards the occupant. Unfolded gas bags of mid-mount modules have a rather more symmetrical shape in the longitudinal section of the vehicle, whereas gas bags of top-mount modules have an unsymmetrical shape (FIG. 2).

The gas bag 24 includes a gas bag wall 26, mostly consisting of textile fabric, and a limiting strap 28 which is guided at least partially along the gas bag wall 26 and may likewise consist of a textile fabric. Lugs 30 are provided on the gas bag wall 26 to guide the limiting strap 28. The lugs 30 are preferably produced from the textile fabric of the gas bag wall 26 and are sewn to it. In FIGS. 1 and 2 the limiting strap 28 is fastened to the module housing 18 by a first end 32 of the limiting strap, guided by the lugs 30 and fastened to the closure device 22 by a second end 34.

In the present case, the closure device 22 is a ventilation flap, but could also be constructed as a slider, for example. In its initial position, the closure device 22 is constructed such that the discharge opening 20 is exposed.

The length of the limiting strap 28 is established precisely such that it activates the closure device 22 in case of an unimpeded unfolding of the gas bag 24, i.e. pulls the ventilation flap shut so that the discharge opening 20 is closed. The optimum length of the limiting strap 28 may therefore be determined in a fully unfolded gas bag by means of a measurement of length from an attachment point of the first end 32 of the limiting strap 28 over the guide lugs 30 on the gas bag wall 26 up to the attachment point of the second end 34 of the limiting strap 28 on the closed ventilation flap. In most cases, the limiting strap 28 is constructed slightly shorter in order to reliably keep the ventilation flap closed against the internal pressure of the gas bag 24 with a permanent tractive force. The gas bag wall 26 is then drawn inwards into the interior of the gas bag 24 at the points at which the lugs 30 of the limiting strap 28 engage. In the fully unfolded state, viewed from the exterior, the gas bag 24 therefore has small indentations at the points in which the lugs 30 are fastened.

If the gas bag 24 can not unfold fully because a child's seat has been installed (not shown) or because the occupant 14 is bent forward, then the limiting strap 28 remains slack and the discharge opening 20 remains free (FIG. 1). Gas can escape through the discharge opening 20, whereby the speed of unfolding of the gas bag 24 reduces and the occupant 14, who is poorly positioned for the case of restraint, is protected.

In an optimum sitting position of the occupant 14 or without a child's seat being installed, the gas bag 24 can unfold fully at a higher speed (FIG. 2) and can reach its optimum restraint values with regard to unfolding speed, gas bag volume and gas bag hardness. The closure device 22 is actuated during the unfolding process so that the discharge opening 20 is closed and no gas can issue from this discharge opening 20.

In the unfolded state of the gas bag 24, the gas bag wall 26 can be divided into a front wall section 36 which faces the occupant 14, and a rear wall section 38 which faces away from the occupant 14. The almost vertical dashed line in FIGS. 1 and 2 is to be understood as a dividing line of these wall sections 36, 38 for the fully unfolded gas bag 24. In the present case, the limiting strap 28 is guided substantially over its entire length against the gas bag wall 26, with the limiting strap 28 extending from the rear wall section 38 over the front wall section 36 back to the rear wall section 38 again.

Figure 3:
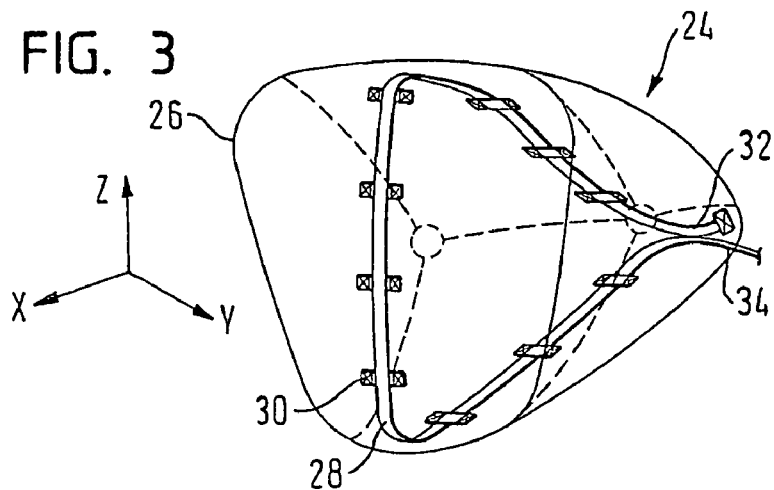
FIG. 3 shows a perspective view of the gas bag with limiting strap in a first embodiment.

FIG. 3 shows the gas bag 24 in a diagrammatic, perspective view, the gas bag wall 26 being illustrated so as to be transparent in order to be able to recognize the limiting strap 28 lying inside. The guiding of the limiting strap is identical in FIGS. 1 to 3. The first end 32 of the limiting strap is fastened to the rear wall section 38 or to the module housing 18 and the second end 34 is fastened to the closure device 22 which is no longer illustrated in FIG. 3. Moreover, in the unfolded state of the gas bag 24, the limiting strap 28 lies substantially in a vertical plane, which is the XZ plane in the present case. This means that the gas bag 24 reacts to obstacles to unfolding in the region of the path of the limiting strap over its entire height (extension in Z direction), by the discharge opening 20 not being closed.

Figure 4:
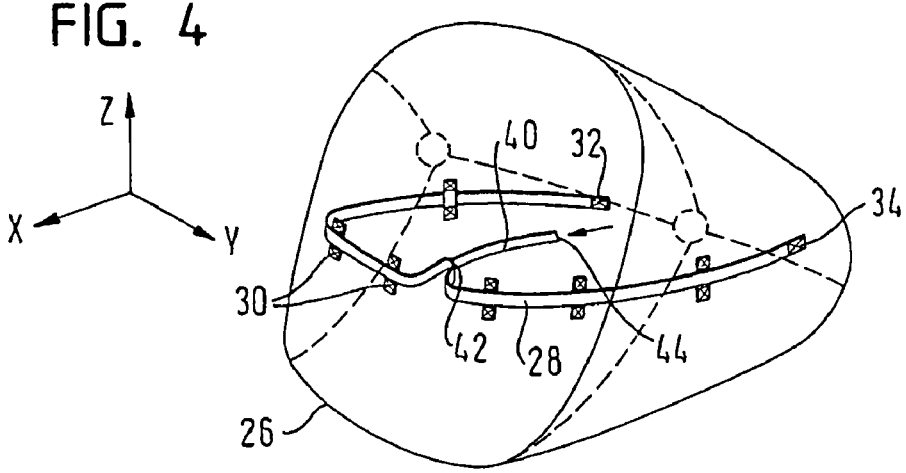
FIG. 4 shows a perspective view of the gas bag with limiting strap in a second embodiment.

FIG. 4 shows a second embodiment in which the first end 32 and the second end 34 of the limiting strap 28 are fastened to the rear wall section 38 or to the module housing 18. In addition, a traction strap 40 is provided, a first end 42 of the traction strap 40 engaging relatively centrally on the limiting strap 28 and a second end 44 of the traction strap 40 engaging on the closure device 22.

Moreover, in FIG. 4 in the unfolded state of the gas bag 24, the limiting strap 28 lies substantially in a horizontal plane (XY plane). This means that the gas bag only reacts to obstacles to unfolding on a restricted height range, namely approximately the height of the encircling limiting strap 28, but in place of that it reacts on the entire width (Y extension) of the gas bag 24, by the discharge opening remaining free.

In the first embodiment in accordance with FIGS. 1 to 3, on the one hand the traction strap 40 can in fact be dispensed with, on the other hand a higher friction effect exists with the actuation of the closure arrangement 22. In the first embodiment according to FIG. 3, the limiting strap 28 must in fact be tensioned from its fixed first end 32 over the entire length of the limiting strap 28 up to the closure device 22. In the second embodiment according to FIG. 4, the tensioning takes place from both ends 32, 34 of the limiting strap 28 up to the point of attachment of the traction strap 40, i.e. approximately over half the length of the limiting strap 28. In addition, in the unfolded state of the gas bag 24, the traction strap 40 is preferably arranged such that it extends substantially from a centre of the front wall section 36 through the gas bag 24 towards the module housing 18, whereby a good transfer of traction to the closure device 22 is provided. This provides a greater flexibility as regards the type and position of the closure device 22.

Figure 5:
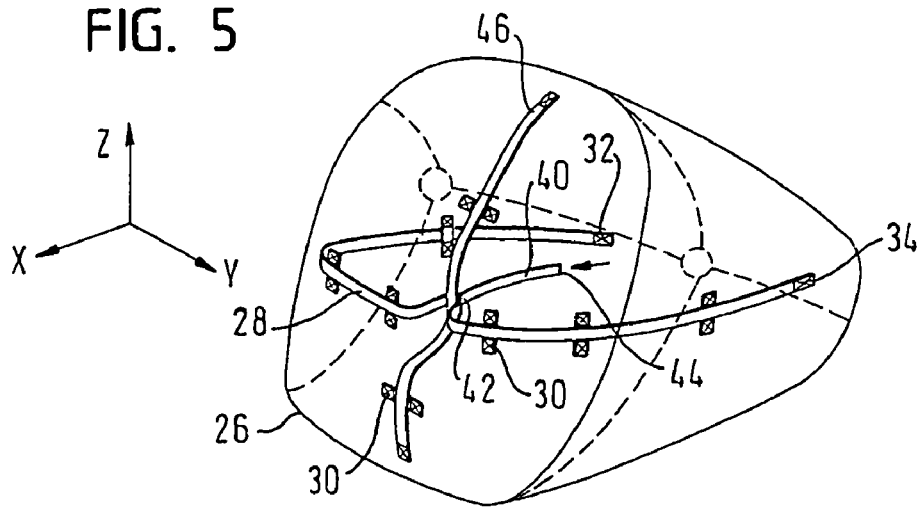
FIG. 5 shows a perspective view of the gas bag with limiting strap in a third embodiment.

FIG. 5 shows a third embodiment, in which in addition to the second embodiment of FIG. 4, a second limiting strap 46 is provided which lies substantially in a vertical plane in the unfolded state of the gas bag 24.

The embodiments of FIGS. 3 to 5 are to be understood by way of example; the limiting strap 28 does not in any way have to lie in a horizontal or vertical plane, but rather may also be arranged at other desired angles in further embodiments.

The invention claimed is:

1. A gas bag module comprising
a module housing (18),
a gas bag (24) having a gas bag wall (26),
a discharge opening (20) which can be closed by a closure device (22), and
a limiting strap (28),
said limiting strap (28) being coupled with said gas bag wall (26) and said closure device (22),
said limiting strap (28) being tensioned in case of an unimpeded unfolding of said gas bag (24),
said limiting strap (28) activating said closure device (22) in case of unimpeded unfolding of said gas bag (24) such that said closure device (22) closes said discharge opening (20) and
said limiting strap (28) being guided substantially over its entire length along said gas bag wall (26).

2. The gas bag module according to claim 1, wherein said discharge opening (20) is provided in said module housing (18).

3. The gas bag module according to claim 1, wherein said closure device (22) is a ventilation flap.

4. The gas bag module according to claim 1, wherein lugs (30) are provided on said gas bag wall (26) to guide said limiting strap (28).

5. The gas bag module according to claim 1, wherein in an unfolded state of said gas bag (24), said limiting strap (28) lies substantially in a vertical plane.

6. The gas bag module according to claim 1, wherein in an unfolded state of said gas bag (24), said limiting strap (28) lies substantially in a horizontal plane.

7. The gas bag module according to claim 1, wherein in an unfolded state, said gas bag wall (26) has a front wall section (36) facing an occupant (14), and a rear wall section (38), facing away from said occupant (14), said limiting strap (28) extending from said rear wall section (38) over said front wall section (36) back to said rear wall section (38) again.

8. A gas bag module comprising
a module housing (18),
a gas bag (24) having a gas bag wall (26),
a discharge opening (20) which can be closed by a closure device (22), and
a limiting strap (28),
said limiting strap (28) being coupled with said gas bag wall (26) and said closure device (22), wherein a first end (32) of said limiting strap (28) is fastened to one of a rear wall section (38) and said module housing (18), and a second end (34) is secured to said closure device (22),
said limiting strap (28) being tensioned in case of an unimpeded unfolding of said gas bag (24) such that said closure device (22) closes said discharge opening (20) and
said limiting strap (28) being guided substantially over its entire length along said gas bag wall (26).

9. A gas bag module comprising
a module housing (18),
a gas bag (24) having a gas bag wall (26),
a discharge opening (20) which can be closed by a closure device (22), and
a limiting strap (28),
said limiting strap (28) being coupled with said gas bag wall (26) and said closure device (22), wherein a first and a second end (32,34) of said limiting strap (28) are fastened to one of a rear wall section (38) and said module housing (18), and a traction strap (40) is provided, a first end (42) of said traction strap (40) being secured to said limiting strap (28) and a second end (44) of said traction strap (40) being secured to said closure device (22),
said limiting strap (28) being tensioned in case of an unimpeded unfolding of said gas bag (24),
said limiting strap (28) activating said closure device (22) in case of unimpeded unfolding of said gas bag (24) such that said closure device (22) closes said discharge opening (20) and
said limiting strap (28) being guided along said gas bag wall (26).

10. A gas bag module comprising
a module housing (18),
a gas bag (24) having a gas bag wall (26),
a discharge opening (20) which can be closed by a closure device (22), and
a limiting strap (28),
said limiting strap (28) being coupled with said gas bag wall (26) and said closure device (22),
said limiting strap (28) being tensioned in case of an unimpeded unfolding of said gas bag (24),
said limiting strap (28) activating said closure device (22) in case of unimpeded unfolding of said gas bag (24) such that said closure device (22) closes said discharge opening (20), and
said limiting strap (28) being guided along said gas bag wall (26) between the connection with the gas bag wall and the connection with the closure device, wherein in an unfolded state, said gas bag wall (26) has a front wall section (36) facing an occupant (14), and a rear wall section (38), facing away from said occupant (14), said limiting strap (28) extending from said rear wall section (38) over said front wall section (36) back to said rear wall section (38) again.

11. The gas bag module according to claim 10, wherein said discharge opening (20) is provided in said module housing (18).

12. The gas bag module according to claim 10, wherein said closure device (22) is a ventilation flap.

13. The gas bag module according to claim 10, wherein lugs (30) are provided on said gas bag wall (26) to guide said limiting strap (28).

14. The gas bag module according to claim 10, wherein in an unfolded state of said gas bag (24), said limiting strap (28) lies substantially in a vertical plane.

15. A gas bag module comprising
a module housing (18),
a gas bag (24) having a gas bag wall (26), a discharge opening (20) which can be closed by a closure device (22), and a limiting strap (28), said limiting strap (28) being coupled with said gas bag wall (26) and said closure device (22), wherein a first end (32) of said limiting strap (28) is fastened to one of a rear wall section (38) and said module housing (18), and a second end (34) is secured to said closure device (22), said limiting strap (28) being tensioned in case of an unimpeded unfolding of said gas bag (24) such that said closure device (22) closes said discharge opening (20), and said limiting strap (28) being guided along said gas bag wall (26) between the connection with the gas bag wall and the connection with the closure device.

16. The gas bag module according to claim 15, wherein said discharge opening (20) is provided in said module housing (18).

17. The gas bag module according to claim 15, wherein said closure device (22) is a ventilation flap.

18. The gas bag module according to claim 15, wherein lugs (30) are provided on said gas bag wall (26) to guide said limiting strap (28).

19. The gas bag module according to claim 15, wherein in an unfolded state of said gas bag (24), said limiting strap (28) lies substantially in a vertical plane.

20. The gas bag module according to claim 15, wherein in an unfolded state, said gas bag wall (26) has a front wall section (36) facing an occupant (14), and a rear wall section (38), facing away from said occupant (14), said limiting strap (28) extending from said rear wall section (38) over said front wall section (36) back to said rear wall section (38) again.

* * * * *